United States Patent
Nagel

(10) Patent No.: US 12,140,117 B2
(45) Date of Patent: Nov. 12, 2024

(54) DETECTING ROTOR BLADE CLEARANCE IN A WIND TURBINE USING DOPPLER SHIFT AND A MATHEMATICAL MODEL

(71) Applicant: Siemens Gamesa Renewable Energy A/S, Brande (DK)

(72) Inventor: Eirik Nagel, Flensburg (DE)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 284 days.

(21) Appl. No.: 17/598,960

(22) PCT Filed: Mar. 16, 2020

(86) PCT No.: PCT/EP2020/057067
§ 371 (c)(1),
(2) Date: Sep. 28, 2021

(87) PCT Pub. No.: WO2020/200723
PCT Pub. Date: Oct. 8, 2020

(65) Prior Publication Data
US 2022/0195992 A1 Jun. 23, 2022

(30) Foreign Application Priority Data
Apr. 1, 2019 (EP) .................... 19166597

(51) Int. Cl.
*F03D 7/02* (2006.01)
*F03D 17/00* (2016.01)

(52) U.S. Cl.
CPC .......... *F03D 17/00* (2016.05); *F03D 7/0288* (2013.01); *F05B 2260/84* (2013.01); *F05B 2270/17* (2013.01); *F05B 2270/33* (2013.01)

(58) Field of Classification Search
CPC ..... F03D 7/0288; F03D 17/00; F05B 2270/33
See application file for complete search history.

(56) References Cited

U.S. PATENT DOCUMENTS 7,246,991 B2 7/2007 Bosche
8,131,402 B2 * 3/2012 Neumann ............. F03D 1/0675
416/61

(Continued)

FOREIGN PATENT DOCUMENTS

CN 103890383 A 6/2014
EP 0562825 A1 9/1993

(Continued)

OTHER PUBLICATIONS

PCT International Search Report and Written Opinion of International Searching Authority mailed Jun. 15, 2020 corresponding to PCT International Application No. PCT/EP2020/057067 filed Mar. 16, 2020.

*Primary Examiner* — Sabbir Hasan
(74) *Attorney, Agent, or Firm* — Schmeiser, Olsen & Watts LLP

(57) ABSTRACT

A method of determining a blade clearance during operation of a wind turbine is provided, the blade clearance corresponding to a distance between a rotor blade and a tower of the wind turbine. The method includes (a) detecting a rotor blade velocity, (b) emitting a first signal from an observer location, the first signal having a first frequency, (c) receiving a second signal at the observer location, the second signal being reflected from the rotor blade when the first signal impinges on the rotor blade, (d) determining a Doppler shift of the second signal relative to the first signal, and (e) determining the blade clearance based on the first frequency, the Doppler shift, the observer location, and the rotor blade velocity, wherein the step of determining the blade clearance utilizes a mathematical model. A corresponding system and a wind turbine comprising such a system are also provided.

5 Claims, 3 Drawing Sheets

(56) References Cited

U.S. PATENT DOCUMENTS

| | | |
|---|---|---|
| 9,617,977 B2 | 4/2017 | Slot |
| 2008/0101930 A1* | 5/2008 | Bosche ................ F03D 7/0224 |
| | | 416/61 |
| 2011/0135466 A1 | 6/2011 | Latorre et al. |
| 2014/0278151 A1 | 9/2014 | Newman |
| 2015/0159632 A1 | 6/2015 | Vangen et al. |

FOREIGN PATENT DOCUMENTS

| | | |
|---|---|---|
| EP | 2598750 A2 | 6/2013 |
| EP | 2864632 A2 | 4/2015 |
| EP | 3626965 A1 | 3/2020 |
| EP | 3719475 A1 | 10/2020 |
| WO | 2012032916 A1 | 3/2012 |

* cited by examiner

DETECTING ROTOR BLADE CLEARANCE IN A WIND TURBINE USING DOPPLER SHIFT AND A MATHEMATICAL MODEL

CROSS-REFERENCE TO RELATED APPLICATIONS

This application claims priority to PCT Application No. PCT/EP2020/057067, having a filing date of Mar. 16, 2020, which is based off of EP Application No. 19166597.5, having a filing date of Apr. 1, 2019, the entire contents both of which are hereby incorporated by reference.

FIELD OF TECHNOLOGY

The following relates to wind turbines. More specifically, the following relates to a method of determining a blade clearance during operation of a wind turbine, the blade clearance corresponding to a distance between a rotor blade and a tower of the wind turbine. The following further relates to a system for determining a blade clearance during operation of a wind turbine. Furthermore, the following relates to a wind turbine comprising such system.

BACKGROUND

In the above defined technical field, systems are known, which comprise a plurality of radar units operatively configured to emit and receive radar signals. The radar units are typically mounted on and around the wind turbine tower, the radar units being positioned so as to measure reflections of an emitted radar signal from the turbine blade. A processing unit is configured to receive measurement data from the radar unit and to determine, by analysis of Doppler shift, time of flight, phase and amplitude in received radar signals relative to transmitted signals due to movement of the blade towards or away from the turbine tower, the velocity of the blade in the direction towards or away from the turbine tower. This permits calculation of the trajectory and, in particular, the absolute speed and position of the blade.

Using radar units to measure blade position based on the Doppler Effect is for example described in EP 2864632 and permits to avoid the installation of other types of sensors on the blades or nacelle of the wind turbine. This reduces manufacturing and maintenance costs of the wind turbine, since sensors positioned on the tower are easier to replace in the field.

However such a solution is not yet optimal considering that for rotating objects, like the rotor blades or the nacelles, installation of a plurality of radar units is required.

A single radar unit may in fact be used but only for detecting the passage of the blade at a single location. At least two radar units (horizontally mounted) are required for following the position of the blade around the nacelle yawing. One radar unit is able to detect the revolution of the blade at a specific position. More than two single radar units may be used for improving redundancy, resolution and confidence of the detection. However, this further increases costs and the need for software resources. Each radar unit requires a dedicated processing unit for analyzing the signals and deriving the position and speed of the blade.

Furthermore, using the Doppler shift requires a huge amount of turbine individual empirical data (see e.g. U.S. Pat. No. 7,246,991 B1, column 4, lines 36-39).

An aspect relates to an easier and improved way of efficiently utilizing the Doppler shift to determine rotor blade clearance, in particular without costly and time consuming acquisition of empirical data for each single wind turbine.

SUMMARY

According to a first aspect of embodiments of the present invention, a method of determining a blade clearance during operation of a wind turbine is provided, the blade clearance corresponding to a distance between a rotor blade and a tower of the wind turbine. The method comprises (a) detecting a rotor blade velocity, (b) emitting a first signal from an observer location, the first signal having a first frequency, (c) receiving a second signal at the observer location, the second signal being reflected from the rotor blade when the first signal impinges on the rotor blade, (d) determining a Doppler shift of the second signal relative to the first signal, and (e) determining the blade clearance based on the first frequency, the Doppler shift, the observer location, and the rotor blade velocity, wherein the step of determining the blade clearance utilizes a mathematical model.

This aspect of embodiments of the invention is based on the idea that a mathematical model providing a relation between blade clearance, the first frequency (i.e. the transmitting frequency), Doppler shift, the observer location, and the rotor blade velocity is utilized to determine the blade clearance based on current measurement data (Doppler shift and rotor blade velocity) and known parameter values (first frequency and observer location). Thus, the method can be used for any wind turbine without the need for collecting empirical data.

According to an embodiment of the invention, the step of determining the blade clearance comprises a lookup in a data array stored in a memory unit, the data array being computed using the mathematical model.

In other words, a data array with pre-computed values of blade clearance for a wide range of parameter values is used for looking up the corresponding blade clearance value instead of computing it on the fly using the mathematical model. In this way, processing resources and time can be saved. The data array may in particular constitute one or more lookup tables or LUTs. Since the static parameter values are known for a given wind turbine, the data array can be pre-computed and stored in a memory unit, e.g. of a wind turbine controller without having to rely on empirical data collection.

According to a further embodiment of the invention, the method further comprises determining a relative blade velocity based on the blade velocity and the observer location.

In this context, the term "relative blade velocity" denotes the magnitude of the blade velocity in a direction from the observer location towards the part of the rotor blade that reflects the first signal. In other words, the "relative blade velocity" is the change in distance between the reflecting part of the rotor blade and the observer location.

The relative blade velocity may be calculated as the magnitude of a projection of the detected rotor blade velocity vector onto a vector extending between the observer location and the part of the rotor blade (e.g. tip of the rotor blade) that reflects the first signal.

According to a further embodiment of the invention, the data array comprises a blade clearance value for each of a plurality of combinations of first frequency values, Doppler shift values and relative blade velocity values. The latter is influenced/defined by the blade/turbine data (in particular blade length, nominal rotor RPM, position of observer location, e.g. on wind turbine tower).

The data array may in particular comprise a plurality of lookup tables, each lookup table corresponding to a certain value of the relative blade velocity and providing blade clearance values for a plurality of combinations of the first frequency and the Doppler shift.

According to a further embodiment of the invention, the first signal is emitted by a leaky feeder arrangement at the observer location, and the second signal is received by the leaky feeder arrangement.

The leaky feeder arrangement may comprise one or more leaky feeders, i.e. elongate cables or wave guides with leaky sections that allow emission of the first signal and/or receiving of the second signal.

In this case, the observer location (i.e. where the signals are emitted and received) will be a point (leaky section or slot) on a leaky feeder.

According to a second aspect of the invention, a system for determining a blade clearance during operation of a wind turbine is provided, the blade clearance corresponding to a distance between a rotor blade and a tower of the wind turbine. The system comprises (a) a velocity detector configured to detect a rotor blade velocity, (b) a signal emitter configured to emit a first signal from an observer location, the first signal having a first frequency, (c) a signal receiver configured to receive a second signal at the observer location, the second signal being reflected from the rotor blade when the first signal impinges on the rotor blade, (d) a signal processor coupled to the signal emitter and the signal receiver, wherein the signal processor is configured to determine a Doppler shift of the second signal relative to the first signal, and (e) a determination device configured to determine the blade clearance based on the first frequency, the Doppler shift, the observer location, and the rotor blade velocity utilizing a mathematical model.

The system according to this aspect is essentially based on the same idea as the first aspect described above.

The velocity detector may in particular be capable of detecting the rotor speed of the wind turbine and derive a vector representation of the velocity of a certain part of the rotor blade (the part of interest, such as a tip section of the rotor blade) from the rotor speed (using relevant parameters of the wind turbine, such as blade length, location of the part of interest, etc.).

The signal processor and/or the determination device may be separate entities, e.g. included in a wind turbine controller, or may form part of control electronics located together with or close to the signal emitter and receiver.

According to an embodiment of the invention, the determination device comprises a memory unit storing a data array computed using the mathematical model, and wherein the determination device is configured to determine the blade clearance by performing a lookup in the data array.

In other words, a data array with pre-computed values of blade clearance for a wide range of parameter values is stored in the memory unit and used for looking up the corresponding blade clearance value instead of computing it on the fly using the mathematical model. In this way, processing resources and time can be saved. The data array may in particular constitute one or more lookup tables or LUTs. Since the static parameter values are known for a given wind turbine, the data array can be pre-computed and stored in the memory unit without having to rely on empirical data collection.

According to a further embodiment of the invention, the determination device further comprises a velocity calculation unit configured to calculate a relative blade velocity based on the blade velocity and the observer location.

As above, the term "relative blade velocity" denotes the magnitude of the blade velocity in a direction from the observer location towards the part of the rotor blade that reflects the first signal. In other words, the "relative blade velocity" is the change in distance between the reflecting part of the rotor blade and the observer location.

The velocity calculation unit may calculate the relative blade velocity as the magnitude of a projection of the detected rotor blade velocity vector onto a vector extending between the observer location and the part of the rotor blade (e.g. tip of the rotor blade) that reflects the first signal.

According to a further embodiment of the invention, the data array comprises a blade clearance value for each of a plurality of combinations of first frequency values, Doppler shift values and relative blade velocity values.

The data array may in particular comprise a plurality of lookup tables, each lookup table corresponding to a certain value of the relative blade velocity and providing blade clearance values for a plurality of combinations of the first frequency and the Doppler shift.

Thus, after determining the relative blade velocity, the appropriate lookup table can be selected and the value of the blade clearance that corresponds to the values of the first frequency and Doppler shift can easily be looked up.

According to a further embodiment of the invention, the signal emitter and the signal receiver are comprised by a leaky feeder arrangement.

The leaky feeder arrangement may comprise one or more leaky feeders, i.e. elongate cables or wave guides with leaky sections that allow emission of the first signal and/or receiving of the second signal.

According to a further embodiment of the invention, the leaky feeder arrangement comprises at least one leaky feeder forming a loop shape around the tower of the wind turbine.

In other words, at least one leaky feeder is arranged as a loop around the tower. Thereby, the at least one leaky feeder is capable of emitting and/or receiving signals relevant for detecting the rotor blade for any yaw angle, i.e. for any wind direction.

In some embodiments, the leaky feeder arrangement does not extend all the way around the tower but only forms an arc shape or an arc segment around a part of the tower circumference.

According to a further embodiment of the invention, the at least one leaky feeder is a leaky coaxial cable or a leaky waveguide.

A coaxial leaky cable may in particular be suitable in implementations where the first and second signals are RF signals. A leaky waveguide or a leaky stripline or microstrip may in particular be suitable for embodiments where the first and second radar signals have higher frequencies.

According to a third aspect of the invention, a wind turbine comprising a tower and a least one rotor blade is provided. The wind turbine further comprises a system according to the second aspect or any of the above embodiments.

This aspect is essentially based on the same idea as the first and second aspects discussed above.

According to a further embodiment of the invention, the observer location is positioned on a loop shape extending around a circumference of the tower.

In other words, the observer location is a position on the tower surface at a predetermined height above ground level and thus at a predetermined distance from the rotor axis.

The blade clearance determined in accordance with the aspects and embodiments described above may also be used to determine rotor blade vibrations by determining the time derivative of the blade clearance.

BRIEF DESCRIPTION

Some of the embodiments will be described in detail, with reference to the following figures, wherein like designations denote like members, wherein.

Figure 4:
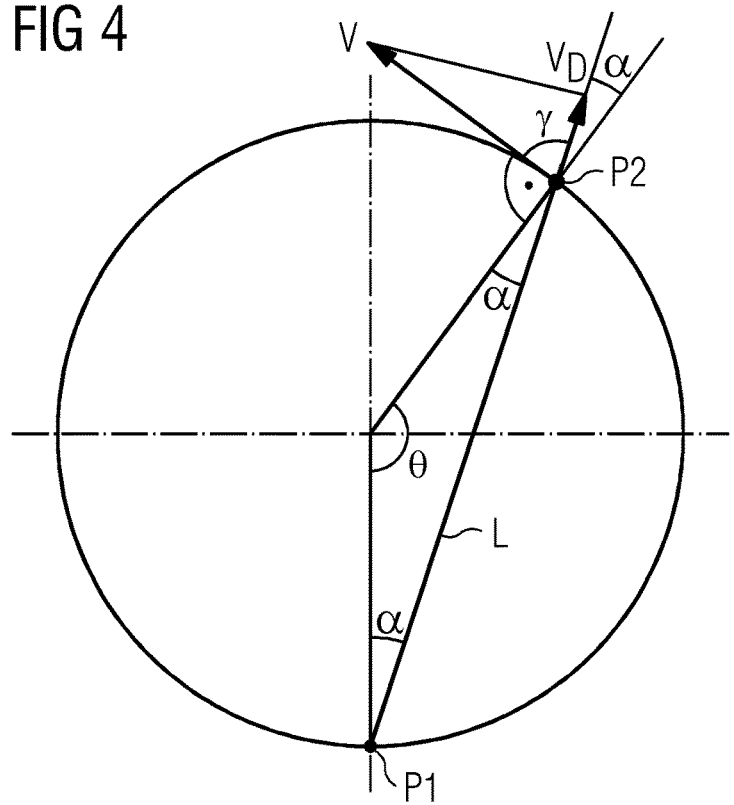
Figure 5:
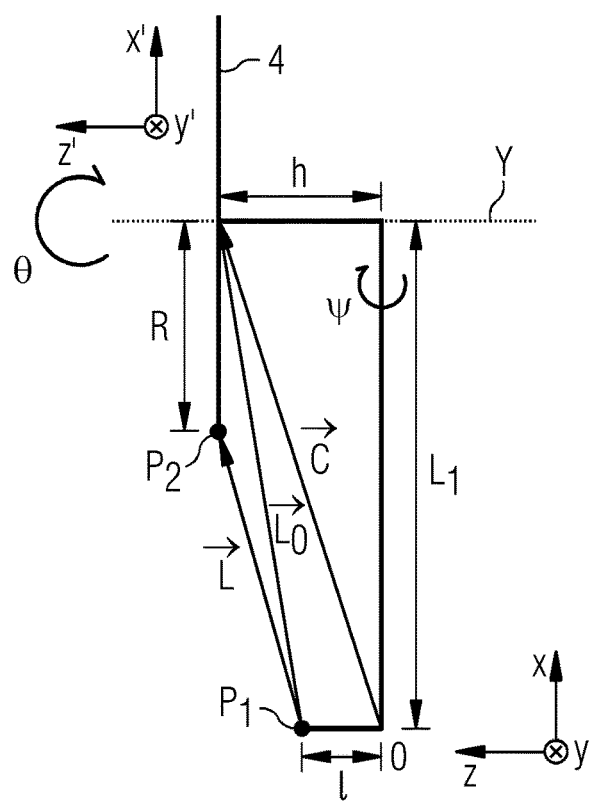

FIG. 4 shows a schematic front view of a rotating rotor blade, in particular with regard to a relation between tangential and radial velocity of the rotating rotor blade in accordance with a mathematical model utilized by embodiments of the present invention; and FIG. 5 shows a schematic side view of a wind turbine model as used to establish a mathematical model utilized by embodiments of the present invention.

DETAILED DESCRIPTION

The illustrations in the drawings are schematic. It is noted that in different figures, similar or identical elements are provided with the same reference numerals or with reference numerals which differ only within the first digit.

Figure 1:
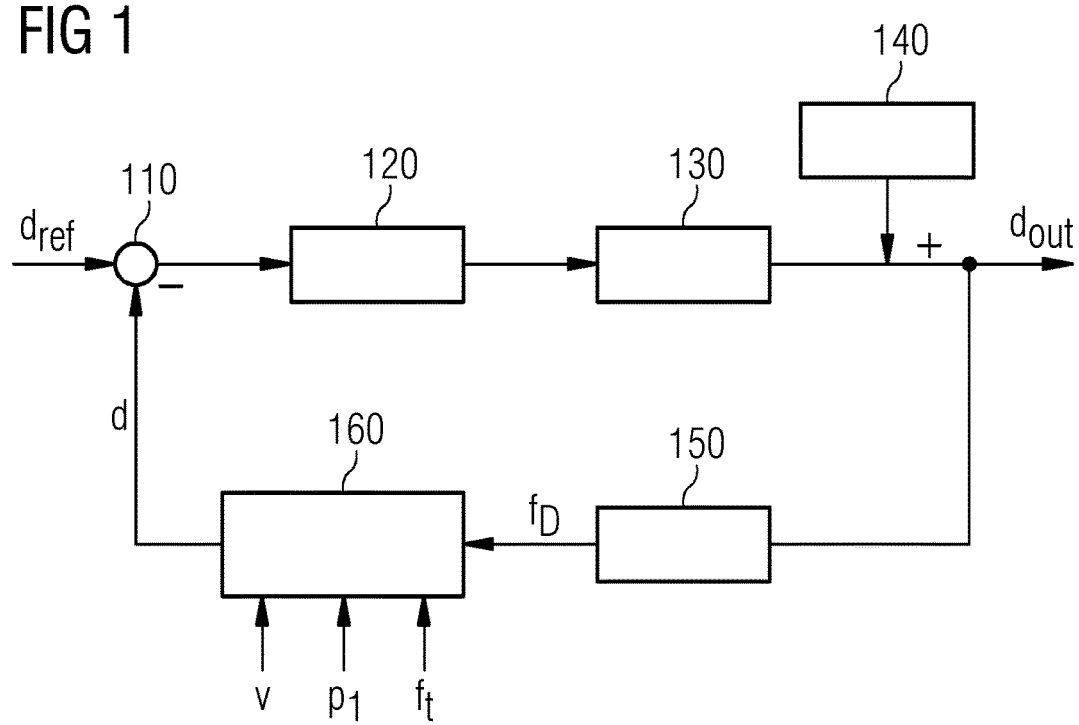
FIG. 1 shows a block diagram of a wind turbine control system utilizing an embodiment of the present invention.

FIG. 1 shows a block diagram of a wind turbine control system utilizing an embodiment of the present invention. More specifically, FIG. 1 shows a control system for blade clearance, i.e. for assuring that a rotor blade of a wind turbine keeps a certain distance (clearance) from the tower of the wind turbine during operation.

The depicted system comprises a subtraction point 110, a controller 120, a pitch drive 130, a load (or disturbance, e.g. wind) 140, a Doppler shift determining device 150 (or radar unit), and a lookup array device 160. The system receives a clearance set point $d_{ref}$ at one input of subtraction unit 110. The other input of the subtraction unit 110 receives a measured blade clearance d. The difference (dref−d) is supplied to controller 120 which provides a corresponding control signal to pitch drive unit 130. The load 140 represents an indication of the current load on the wind turbine.

The Doppler shift determining device 150 (which will be described in more detail below) is configured to determine a Doppler shift $f_D$ based on a signal emitted towards a rotor blade and a signal reflected from the rotor blade. The determined Doppler shift is supplied to lookup array device 160 which also receives inputs relating to the rotor speed v, an observer location $P_1$ and a frequency $f_t$ of the signals emitted to determine the Doppler shift. Using these parameter values, the lookup array device 160 determines the value d of the blade clearance and supplies it to the subtraction unit 110 as described above. The subtraction unit 110 thus calculates the difference between the clearance set point $d_{ref}$ and the actual (measured clearance) d.

Figure 2:
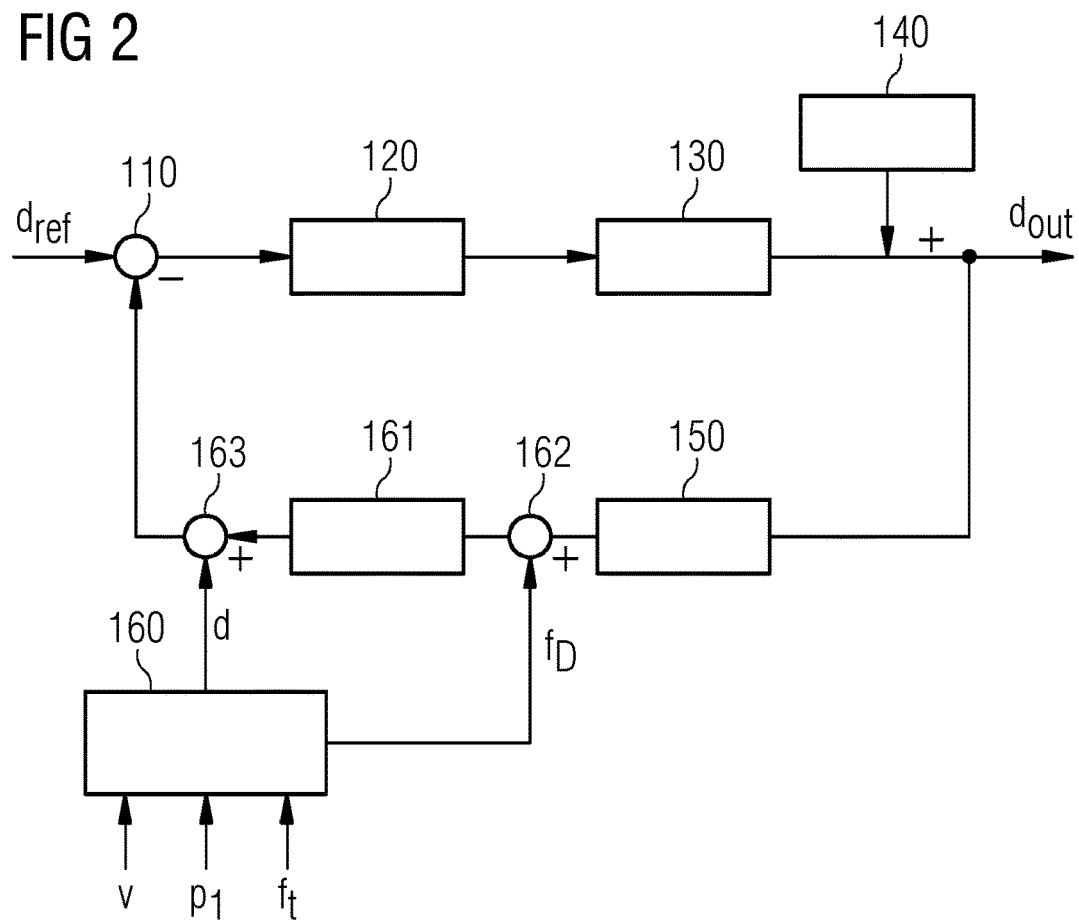
FIG. 2 shows a block diagram of another wind turbine control system utilizing an embodiment of the present invention.

FIG. 2 shows a block diagram of another wind turbine control system utilizing an embodiment of the present invention in a different way in comparison to the system shown in FIG. 1 and discussed above. More specifically, the control system depicted in FIG. 2 comprises an empirical lookup unit 161 (as known in the art and discussed in the introduction) to determine a clearance value based on the Doppler shift obtained by Doppler shift determining device 150. Additionally, the lookup array unit 160 is used to check the values provided by the empirical lookup unit 161. Although the drawing shows that values for both d and $f_D$ are output by the lookup array unit 160 and supplied to respective summation points 163, 162, it should be understood that only one of these values are used in a specific implementation. The idea is to have the mathematical model 160 running in the background such that the expected values of either d or $f_D$ can be compared with the measured value output by either the Doppler shift determining device 150 or the empirical lookup unit 161. In case of a deviation exceeding a predetermined threshold, an error message may be output. In other words, the model based device 160 provides a kind of plausibility check.

Figure 3:
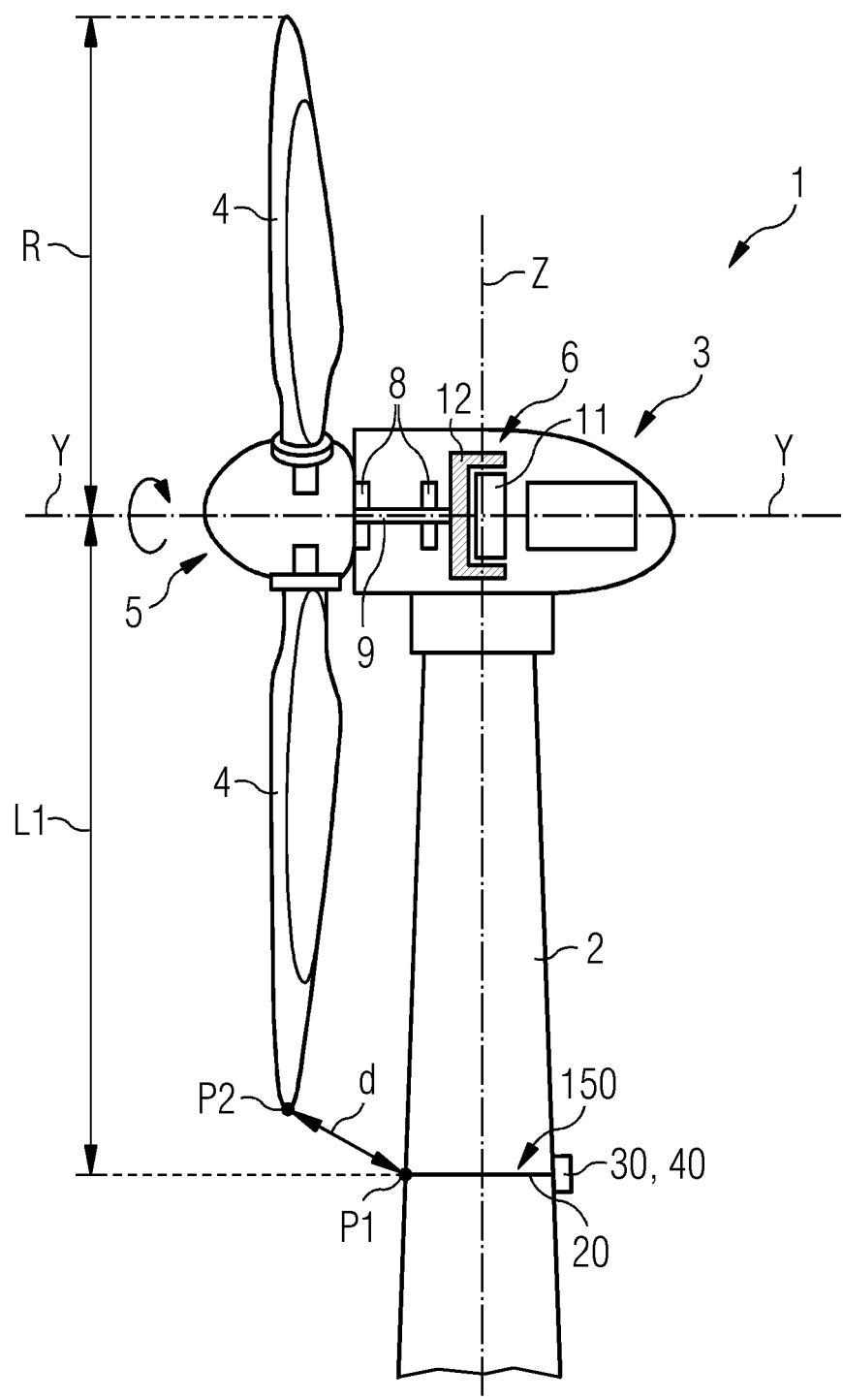
FIG. 3 shows a side view of a wind turbine comprising a system according to an embodiment of the present invention.

FIG. 3 shows a side view of a wind turbine 1 comprising a system according to an embodiment of the present invention.

More specifically, the wind turbine 1 comprises a tower 2, which is mounted on a non-depicted fundament. A nacelle 3 is arranged on top of the tower 2. In between the tower 2 and the nacelle 3, a yaw angle adjustment device (not shown) is provided, which is capable of rotating the nacelle around a vertical yaw axis Z. The wind turbine 1 further comprises a wind rotor 5 having one or more rotor blades 4 (in the perspective of FIG. 1 only two blades 4 are visible). The wind rotor 5 is rotatable around a rotational axis Y. In general, when not differently specified, the terms axial, radial and circumferential in the following are made with reference to the rotational axis Y. The rotor blades 4 extend radially with respect to the rotational axis Y. The wind turbine 1 comprises an electric generator 6 having a stator 11 and a rotor 12. The rotor 12 is rotatable with respect to the stator 11 about the rotational axis Y to generate electrical power. The electric generator 6 and the generation of electrical power through embodiments of the present invention is not a specific aspect of embodiments of the present invention and will therefore not be described in further detail.

FIG. 3 further shows a Doppler shift determining device 150 of a system according to embodiments of the present invention. The device 150 comprises a leaky feeder arrangement 20 mounted at the tower 2, and a transmitter 30 and a receiver 40 coupled to the leaky feeder arrangement 20. The transmitter 30 is configured to supply a first signal to the leaky feeder arrangement 20 which emits (leaks) it from the observer location P1. The receiver 40 is configured to receive a second signal from the leaky feeder arrangement 20, e.g. a signal reflected from point P2 on the rotor blade 4 when the first signal hits the rotor blade 4 and received at the observer location P1. The apparatus further comprises a processing unit (not shown) configured to determine the Doppler shift $f_D$. The leaky feeder arrangement surrounds the entire circumference of the tower 2. The radial distance from the rotor axis Y to the blade tip P2 is R while the radial distance from the rotor axis Y to the leaky feeder arrangement 20 is L1.

FIG. 4 shows a schematic front view of a rotating rotor blade 4, in particular with regard to a relation between tangential velocity v and radial velocity (also referred to as relative velocity) $v_D$ of the point P2 on the rotor blade 4 in accordance with a mathematical model utilized by embodiments of the present invention. The observer location P1 is located at the bottom of the drawing. Thus, when the rotor blade 4 rotates and the point P2 moves correspondingly, the rotating movement will cause a radial movement of P2 with a relative velocity $v_D$ given as the projection of the tangential velocity v (i.e. the rotational speed of the rotor 4 at P2) on the vector L extending between P1 and P2. This radial movement will influence the measured Doppler shift $f_D$ and will therefore have to be taken into consideration as shown in the following.

FIG. 5 shows a schematic side view of a wind turbine model as used to establish a mathematical model utilized by embodiments of the present invention. As can be seen, the model depicted in FIG. 5 corresponds essentially to the view presented in FIG. 3 and introduces a number of angles, vectors and other parameters. The angle θ is the rotational angle (around the rotational axis Y) of the rotor while Ψ is the yaw angle (around the axis of the tower 2). The distance between the central tower axis and the rotor plane is h. Similarly, the distance between the central tower axis and the observer location P1 (i.e. the radius of the loop-shaped leaky feeder arrangement 20) is l. The distance from the rotor axis Y to the observer location P1 is L1.

For given values of transmitter frequency (first frequency) $f_t$, radial (or relative) velocity $v_D$ and speed of light $c_0$, the Doppler shift $f_D$ is given as $$f_D = 2 f_t \frac{v_D}{c_0}$$

The relative velocity $v_D$ is given as $$v_D = \frac{\vec{L} \cdot \vec{v}}{|\vec{L}|}$$

It can be shown that the scalar product in the numerator of the above equation is given as $$\vec{L} \cdot \vec{v} = -R\omega(L_1 \sin\theta \cos^2\psi + L_1 \sin\theta \sin^2\psi - l \cos\theta \sin\psi)$$

and that the denominator is given as $$|\vec{L}| = \sqrt{(L_1 + R\cos\theta)^2 + (h\sin\theta + R\sin\theta\cos\psi)^2 + (h\cos\psi - l - r\sin\theta\sin\psi)^2}$$

Referring still to FIG. 4 and FIG. 5, the following relation between Doppler shift $f_D$ and radial velocity $v_D$ is established:

$$f_D = 2 f_t \frac{v}{c_0} \cos\alpha = 2 f_t \frac{v_D}{c_0}$$

Using the above formulas, a data array for looking up the blade clearance d for a large number of combinations of values for Doppler shift $f_D$, radial velocity $v_D$, and transmission frequency $f_t$ can be calculated and stored for a given wind turbine (where the observer location P1 is given by the distances $L_1$ and l in FIG. 5). The resulting data array is stored in a lookup array device 160 (see FIG. 1 and FIG. 2) and allows easy, cheap and precise determination of the blade clearance during operation of a wind turbine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of determining a blade clearance during operation of a wind turbine, the blade clearance corresponding to a distance between a rotor blade and a tower of the wind turbine, the method comprising:
    detecting a rotor blade velocity;
    emitting a first signal from an observer location, the first signal having a first frequency;
    receiving a second signal at the observer location, the second signal being reflected from the rotor blade when the first signal impinges on the rotor blade;
    determining a Doppler shift of the second signal relative to the first signal; and
    determining the blade clearance based on the first frequency, the Doppler shift, the observer location, and the rotor blade velocity;
    wherein the step of determining the blade clearance utilizes a mathematical model.

2. The method according to claim 1, wherein the step of determining the blade clearance comprises a lookup in a data array stored in a memory unit, the data array being computed using the mathematical model.

3. The method according to claim 1, further comprising determining a relative blade velocity based on the rotor blade velocity and the observer location.

4. The method according to claim 2, wherein the data array comprises a blade clearance value for each of a plurality of combinations of first frequency values, Doppler shift values and relative blade velocity values.

5. The method according to claim 1, wherein the first signal is emitted by a leaky feeder arrangement at the observer location, and wherein the second signal is received by the leaky feeder arrangement.

* * * * *